United States Patent [19]

Foley

[11] Patent Number: 5,012,250

[45] Date of Patent: Apr. 30, 1991

[54] RADIATOR OF MICROWAVE AND INFRARED ENERGY TO SIMULATE TARGET

[75] Inventor: Kenny B. Foley, Ridgecrest, Calif.

[73] Assignee: The United States of America as represented by the Secretary of the Navy, Washington, D.C.

[21] Appl. No.: 516,374

[22] Filed: Apr. 30, 1990

[51] Int. Cl.⁵ .................... G01S 7/50; G01S 7/40
[52] U.S. Cl. ................................ 342/53; 342/170; 342/165; 342/169
[58] Field of Search .............. 342/53, 165, 169, 170, 342/175

[56] References Cited

U.S. PATENT DOCUMENTS

| | | | |
|---|---|---|---|
| 3,167,768 | 1/1965 | Rosen | 342/170 |
| 3,784,836 | 1/1974 | Tolliver | 250/495.1 |
| 3,906,499 | 9/1975 | Redman | 342/167 |
| 3,906,500 | 9/1975 | Redman | 342/167 |
| 3,953,850 | 4/1976 | Redman | 342/167 |
| 3,962,657 | 6/1976 | Redman et al. | 330/4.3 |
| 3,986,394 | 10/1976 | Greenlees | 73/167 |
| 4,013,892 | 3/1977 | Udart | 250/495.1 X |
| 4,253,670 | 3/1981 | Moulton et al. | 273/407 |
| 4,282,527 | 8/1981 | Winderman et al. | 343/725 |
| 4,331,878 | 5/1982 | Steinmetz | 250/495.1 X |
| 4,422,646 | 12/1983 | Rosa | 273/348.1 |
| 4,467,327 | 8/1984 | Drake et al. | 434/2 X |
| 4,470,818 | 9/1984 | Marshall | 434/22 |
| 4,477,814 | 10/1984 | Brumbaugh et al. | 343/725 |
| 4,521,780 | 6/1985 | Preikschat | 434/2 |
| 4,546,983 | 10/1985 | Rosa | 273/348.1 |
| 4,572,958 | 2/1986 | Durand et al. | 250/495.1 |
| 4,652,885 | 3/1987 | Saffold et al. | 343/725 |
| 4,698,638 | 10/1987 | Branigan et al. | 343/725 |
| 4,866,454 | 9/1989 | Droessler et al. | 343/725 |
| 4,922,108 | 5/1990 | Modiinski et al. | 250/504 R |

Primary Examiner—John B. Sotomayor
Attorney, Agent, or Firm—Donald E. Lincoln; Melvin J. Sliwka; Sol Sheinbein

[57] ABSTRACT

A target simulates the coincident infrared and microwave signatures of a source being tracked by a missile whose systems are undergoing test.

20 Claims, 1 Drawing Sheet

U.S. Patent Apr. 30, 1991 5,012,250

RADIATOR OF MICROWAVE AND INFRARED ENERGY TO SIMULATE TARGET

BACKGROUND OF THE INVENTION

1. Field of the Invnetion

The development and testing of missiles with particular reference to improvements in means for providing targets which simulate the microwave and infrared energy emission characteristics of a source being tracked by a missile.

2. Discussion of the Prior Art

Devices have been known in the past which provide simulated targets for the testing of missiles in a laboratory environment where the emission of the target occurs in both the microwave and infrared energy portions of the spectrum. One method used in the past employs an incandescent lamp bulb mounted on the top or upper edge of a microwave (MW) horn and antenna of standard size. Although used with some degree of success, the major disadvantage of this method is that the microwave and infrared sources do not appear to originate from the same point; not being co-located, the energy being emitted gives the appearance of perhaps not one but at least two missiles somewhat spatially separated from each other.

Another method of providing dual spectrum simulated targets for laboratory use which has achieved satisfactory results, consists in placing a small microwave antenna, either a miniature horn or poly-rod antenna, in front of and in the middle of a collimating lens. In such a system, the infrared source is located behind the lens.

A third method used to simulate targets having emission characteristics in dual parts of the spectrum consists of placing two microwave horns, one above and the other below, a collimating lens with the infrared source located behind the lens. In systems adopting this third method, microwave energy of equal power and phase is fed to each horn with the result that the microwave target appears to originate from a point exactly between the two horns. With the apparent position of the microwave horns adjusted to appear as though occurring in coincidence with the axis of the infrared source, the appearance is given that both the microwave and infrared energy originate from the same point in space.

The second and third methods discussed hereinabove have the following limitations and disadvantages which are common to both methods. That is, they both suffer from an extremely narrow viewing angle and/or a very small viewing area. While suitable for simulating stationary targets, severely high accuracy pointing requirements are imposed upon the target motion device when the target must be moved over angles of ±25 degrees relative to the missile being tested. In the case of the collimating lens, these limitations and disadvantages are somewhat unattractive because the lenses are heavy and fragile in addition to being very expensive. Malfunctions of the target motion device have been found to be very costly if the lens is destroyed.

Also in connection with any infrared collimating lens, even when provided with an antireflection coating, the collimating lens has the characteristic of reflecting some of the infrared energy emitted by the missile being tested. In such cases, therefore, the missile, whose components are being subjected to the test to determine its reliability, sees in the collimating lens its own image by virtue of the reflected energy; the problem arises when the infrared shutter, that is, the shutter between the lens and the infrared source, is closed. It can easily be appreciated that during such a period, the missile in effect is still locked onto a target —but in effect it "sees" itself by virtue of the heat reflected by the lens. Such a condition is commonly referred to the "narcissistic effect."

The practice of placing a small microwave antenna, whether miniature horn or poly-rod, in front of and in the middle of a collimating lens, has the further disadvantage found almost impossible to overcome. Due to the fact that the microwave antenna must be of very small physical size in order to reduce to a minimum the obscuration of the infrared lens, such antennas are known to be very low in gain (6dB), in the case of horn antennas, or very limited in gain with band width (1–15%) in cases using poly-rod antennas.

Still other disadvantages have been found in methods in which the microwave target is made to appear from a point directly between two horns, one superior to and the other inferior to, a collimating lens cooperating with the infrared source located behind it.

It must be appreciated that the two microwave horns used in such an arrangement, produce grating lobes or beams that are not separated significantly from the position of the principal or main lobe. Such close proximity of the principal lobe to the grating lobes has been found to restrict the area or window in which the missile under test can be moved about without introducing the undesirable possibility of falsely locking onto and tracking onto the side lobes rather than the main lobe.

A further failing found to be present in the two microwave horns vertically disposed approach to dual spectrum targets is that the integrity of the co-locating of the infrared and microwave targets is not readily apparent. The absence of coincidence of the apparent infrared and microwave targets may occur, for example, if the power being supplied to either one of the two microwave horns changes. At such times the power fed to both horns is not balanced, and the apparent microwave position of the target will appear to move toward the horn which has the higher power output. Also, it has been found that if the phase of the power to either of the two horns undergoes a change, the microwave power available to the missile being tested is reduced. In either of these two cases, the system suffers from a loss of calibration which is not readily apparently by physically observing the apparatus. To reestablish or reconfirm system integrity, it is necessary for the user to submit the apparatus for extensive recalibration tests.

SUMMARY OF THE INVENTION

The simulated dual spectrum target of the present invention comprises an arrangement of components which include a microwave horn antenna, a heated infrared source, electrical conductors to supply power to the infrared source and to physically support the infrared source, an infrared absorbing and microwave transmitting window, an electrical connector to provide power to heat the infrared source, a waveguide to coaxial cable adapter, and a coaxial microwave connector. The infrared source is placed at the mouth of the microwave horn antenna in a position coincident with two rectilinear lines which bisect the flare of the microwave horn antenna in both the horizontal and vertical planes. Located inside the microwave horn antenna is a window capable of absorbing infrared energy while at the same time being transparent to microwave energy. The microwave horn antenna aperture is also used as an infrared aperture to collect and direct the infrared energy emitted from the rear of the infrared source and from the external surrounding environment to the infrared/microwave window. When the infrared source is heated with electrical power and microwave energy is fed to the antenna, the result is a high-contrast scene, that is, a hot infrared target in the center which appears to have a uniform ambient temperature background coincident with the center of a microwave target. A practical advantage is that the device has the appearance or simulates the existence of an aircraft or missile which is capable of being seen by a search missile over a wide range of angles.

Accordingly, an object of the invention is to improve simulator targets which operate in the microwave and infrared portions of the spectrum.

Another object of the invention is to furnish a simulated target which can be seen by an intruder missile over a wide range of angles.

A further object of the invention is to present to an attacking missile under test a target which appears to have infrared emission and the microwave signatures in coincidence with each another.

Yet another feature of the invention is a low-cost, lightweight dual spectrum target in which the microwave and infrared signatures give the appearance of occupying the same coordinate location.

Still another feature characterizing the present invention is the construction of a simulated dual spectrum target for laboratory use.

Other objects of the invention will become apparent from the following detailed description of the embodiment of the present invention when taken in conjunction with the accompanying drawings.

BRIEF DESCRIPTION OF THE DRAWINGS

The same reference characters refer to the same elements throughout the severa embodiments of the invention.

DESCRIPTION OF THE PREFERRED EMBODIMENT

Figure 1:
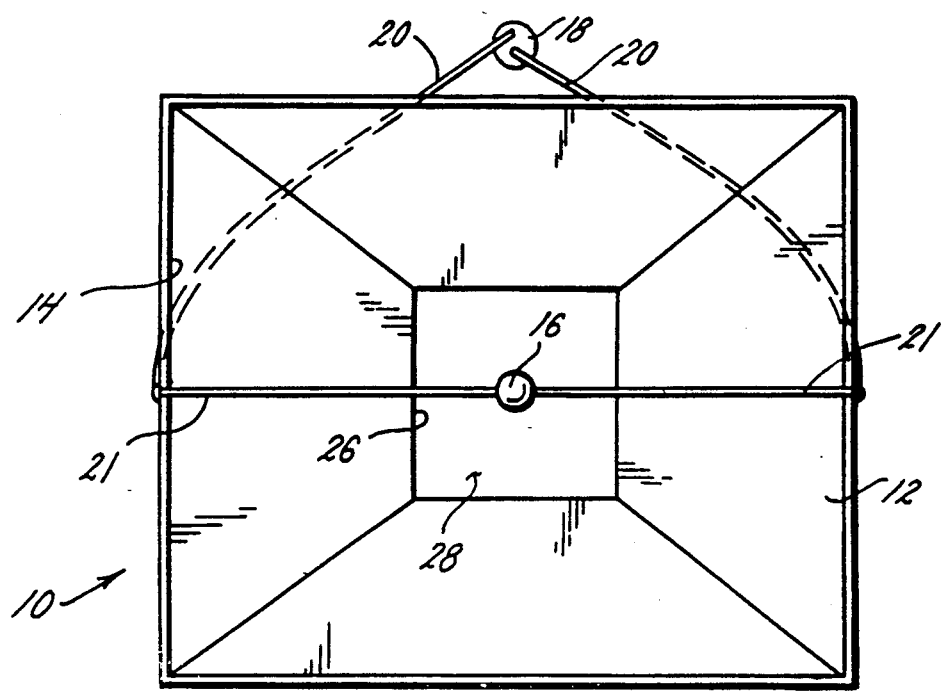
FIG. 1 is a front view of the simulated target in accordance with the invention.

Referring now to FIG. 1, the reference character 10 generally designates a simulated target for the dual spectrum emission in the infrared and microwave energy portions of the spectrum. The combination of the microwave antenna and infrared emitter in the simulator target embodying the invention results in the adoption of a microwave horn antenna 12 which consists of a mouth end of the flared portion 14 represented by a rectangular area at the mouth of the microwave horn antenna 12. A source of infrared energy 16 is disposed in the microwave horn antenna 12 at a point of the intersection of the horizontal and vertical axes of the mouth end of the flared portion 14. For raising the temperature of the source of infrared energy 16 to desired levels of emission a source of electric current 18 (FIG. 2) is connected to the source of infrared energy 16 by means of electrical conductor wires 20 and 21. It will be appreciated that the same electrical conductor wires 21 which assist in supplying power to the source of infrared energy 16 offer the physical means by which the source of infrared energy 16 is supported in the mouth end of the flared portion 14.

For the sake of clarity, the electrical conductor wires 21 in FIG. 1 are illustrated in such a manner that any incidental forces of gravity acting on the source and the wires are for all practical purposes to be ignored.

Microwave energy to create the desired microwave pattern is provided to microwave horn antenna 12 by a coaxial connector 22 in communication with a waveguide to coaxial adapter 24 which is connected to the microwave horn antenna 12.

Located within microwave horn antenna 12 and mounted between the microwave horn antenna 12 and the waveguide to coaxial adapter 24, is a window element 28 whose dimensions are sufficient to exceed the area of that portion of the microwave horn antenna 12 defined by a throat portion 26. Window element 28 is of a material which is transparent to microwave energy in the spectrum of interest yet, simultaneously, it is capable of absorbing any infrared energy which is incident thereon.

Figure 2:
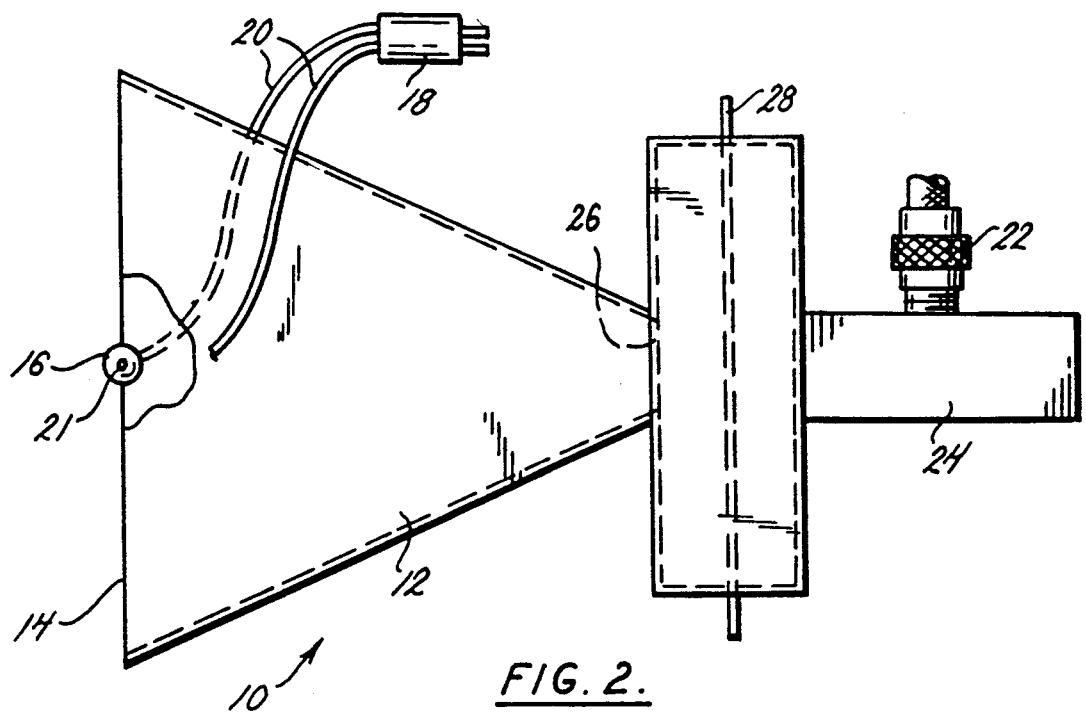
FIG. 2 is a side view of the simulated target shown in FIG. 1.

In operation as a dual spectrum target, the device shown in FIGS. 1 and 2 receives from the coaxial connector 22 microwave energy having the proper modulation to replicate the target which it is desired to simulate.

In the embodiment shown in FIGS. 1 and 2, microwave energy in the frequency range of 8 to 18 GHz is propagated into the waveguide to coaxial adapter 24 by the coaxial connector 22, the microwave energy proceeding through the window element 28, being slightly attenuated thereby, and then proceeding through the microwave horn antenna 12, whereupon it is radiated to the surrounding environment thereby becoming the microwave target signature for the missile whose systems are undergoing test.

Electric power simultaneously being supplied by the source of electrical current 18, the current is then conducted by the electrical wire conductors 20 and 21 to source of infrared energy 16 whereupon it is dissipated into heat and emitted in the band of 0.3 to 14 microns as the radiation product of source of infrared energy 16 generator. The location of the electrical wire conductors 21 across the electrical plane and parallel with the magnetic plane of the microwave horn antenna 12 enables the conductors themselves to be transparent to the microwave fields emanating from the microwave horn antenna 12. It will be appreciated that the radiation from the source of infrared energy 16 is omnidirectional in that it proceeds outwardly of the source of infrared energy 16 omnidirectionally. The energy emitted in the forward direction, that is, in a direction outwardly of the microwave horn antenna 12 is radiated into the surrounding environment and represents the infrared signature of the system to which the missile under test is being directed. On the other hand, the infrared energy emitted in a reverse direction, that is, in the direction toward the throat portion 26 of microwave horn antenna 12 reaches the window element 28 directly or by reflection from the interior walls of the microwave horn antenna 12. Some of the infrared energy within the microwave horn antenna 12 is absorbed by the inner surfaces of its walls. The balance of the infrared energy having sufficient strength to reach the throat portion 26 of the microwave horn antenna 12 is absorbed by the window element 28.

The reflection and final absorption process of infrared energy entering the microwave horn antenna 12 provides a low-contrast uniform aperture or background which enhances the infrared target generated by source of infrared energy 16. It will be appreciated that the arrangement results in a scene of extremely high contrast. That is, an extremely hot infrared target is made to appear that it lies in the center of a region of uniform ambient temperature. By having absorbed substantially all of the infrared energy which enters the opening of the horn, either from source of infrared energy 16 or the surrounding environment, the system embodying the invention prevents the missile from seeing any of its own reflected heat and thereby eliminates the troublesome narcissistic effect discussed earlier hereinabove. The advantage of this arrangement also results in no need to eliminate or suppress the reflection from sources in the testing area which may be produced by indirect laboratory light in the working environment.

In actual application, the target 10 for purposes of convenience may be mounted on a cart (not shown) which is held captive to rails (not shown) thus giving it the ability to reciprocate under the control of a computer-controlled servo motor (not shown). The target 10 may, if desired, be arranged to sustain accelerations up to 222 feet/second$^2$ and speeds up to 16 feet/second during normal operation. In addition, by virtue of the fact that the source of infrared energy 16 is located virtually in the middle of the mouth end of the flared portion 14 of the microwave horn antenna 12, the appearance to the missile seeking the target is that the microwave and infrared signatures originate from the same point.

In the arrangement shown in FIGS. 1 and 2, it may be of value to recognize that the materials used in the construction of the target embodiment of the invention are drawn from conventional sources in accordance with the following list:

Item 12, the microwave horn antenna, is a standard off-the-shelf aluminum horn;

Item 16, the source of infrared energy, is a standard sub-miniature lamp bulb;

Items 20 and 21, the electrical conductor wires, and physical supports for the infrared source, may be solid conductor, size AWG-28, insulated copper wire;

Item 28, the infrared absorbing microwave transmitting window element 28, alternatively may be black paper, IR absorbing glass, or an optical filter;

Item 18, the source of electrical current, is a common commercially available product;

Item 24, the waveguide to coaxial adapter, is a standard off-the-shelf adapter; and Item 22, the coaxial connector, is conventionally delivered in connection with microwave devices.

In summarizing the advantages of having the infrared and microwave sources share a common aperture, it has been found that the required pointing accuracy of the device for positioning the simulated target is greatly reduced. With a construction according to the invention, the pointing accuracy of the target motion device is determined solely by microwave considerations. In one specific application, it is reduced from ±0.3 degrees to ±25 degrees. Thus, the attendant costs of the target positioning device is greatly reduced.

In addition, by eliminating the collimating lens used with the conventional approaches hitherto known, the cost of the target is reduced from an estimated $5,500 to less than $500. Numerous advantages exist from the elimination of the narcissistic effect, as discussed earlier. No heavy collimating lens need be used and it follows from this expedient that the cost of the target positioning device is greatly lowered by having reduced the weight of the load which it must maneuver.

The advantage of the present invention compared to others in which microwave horns are employed is that the single microwave horn antenna, according to the embodiment illustrated in FIGS. 1 and 2, may be of any size, gain or bandwidth. This leads to the economically advantageous development of using one multi-band microwave horn antenna to replace multiple narrow band fixed width targets that use poly-rod antennas.

The use of the small microwave horn antenna leads to the obvious extension into applications involving larger microwave horns in which higher gains can be used. The reduction in microwave power required for testing can eliminate the need for heavy duty microwave amplifiers whose cost is extreme in the range 20 watts to 1 kilowatt of power.

Another advantage over any system using two microwave antennas deployed above and below the axis of the radiation field is the elimination of the closely spaced grating lobes that occur typically when two microwave horns are used. The savings stemming from this novel approach is caused by the elimination of the construction of shields of radar-absorbing material which must be placed around the missile being tested when it is moved over an aperture of two feet or more. Accordingly, the possibility of side lobe locking and tracking is eliminated.

It will be understood that the invention is not limited to the embodiments described above, it being apparent to those skilled in the art that various changes and modifications may be made without departing from the spirit of the invention or the scope of the appended claims.

What I now claim is:

1. A test device for simulating the infrared and microwave signatures of a dual spectrum target comprising:
   an electromagnetic horn having throat and flare portions,
   a source of infrared radiation,
   means for mounting said source at the intersection of the horizontal and vertical axes of the mouth end of the flare portion of said horn,
   means for heating said source
   means for absorbing infrared energy and transmitting microwave energy juxtaposed the throat of said horn, and
   means for exciting said horn, so that the infrared and microwave signatures coincide.

2. A device according to claim 1 wherein the microwave frequency range is 8 to 18 GHz and the infrared emits in the band 0.3 to 14 microns.

3. A device according to claim 1 wherein the radiation pattern of said source is omnidirectional.

4. A device according to claim 1 wherein said mounting means comprises electrical conductors stretched across the opening of said horn at the midpoint of said vertical axis.

5. A device according to claim 4 wherein said electrical conductors are stretched across the electrical plane of the flare portion of said horn.

6. A device according to claim 1 wherein said exciting means is a waveguide.

7. A device according to claim 1 wherein the interior surface of said horn absorbs a portion of the infrared radiation of said horn.

8. A dual spectrum device for simulating the infrared and microwave signatures of a target comprising:
   an electromagnetic horn having throat and flare portions,
   a source of infrared radiation,
   means for supportively mounting said source at the intersection of the horizontal and vertical axes of the mouth of the flare portion of said horn,
   means for heating said source,
   a window member blocking the throat of said horn and disposed perpendicular to the longitudinal axis thereof, said window being transparent to microwave energy and absorptive of infrared radiation from said source, and
   means for exciting said horn, so that the infrared and microwave signatures coincide.

9. A device according to claim 8 wherein the microwave frequency range is 8 to 18 GHz and the infrared emits in the band 0.3 to 14 microns.

10. A device according to claim 8 wherein the radiation pattern of said source is omnidirectional.

11. A device according to claim 8 wherein said mounting means comprises electrical conductors positioned across the mouth opening of said horn at the mid point of said vertical axis.

12. A device according to claim 11 wherein said electrical conductors are stretched across the electrical plane of the mouth of the flare position of said horn.

13. A device according to claim 8 wherein the interior surface of said horn absorbs a portion of the infrared radiation incident on said horn.

14. A device according to calim 8 wherein said exciting means is a waveguide.

15. A duel spectrum test device for simulating the infrared and microwave signatures of a target comprising:
   a microwave horn having throat and flare portions,
   a source of infrared radiation disposed in the mouth of the flare portion of said horn for emitting infrared energy omnidirectionally,
   a plurality of electrical conductors for mounting said source at the intersection of the horizontal and vertical axes of the flare portion of said horn and for supplying energy thereto,
   a window element juxtaposed the throat portion of said horn and perpendicular to the longitudinal axis thereof for absorbing infrared and transmitting microwave energy radiation,
   a microwave guide having one end connected to the throat portion of said horn, and
   a coaxial connector connected to the other end of said microwave guide for supplying microwave energy to excite said horn, so that the infrared and microwave signatures coincide.

16. A test device according to claim 15 wherein said window is black paper.

17. A test device according to claim 15 wherein said window is infrared absorbing glass.

18. A test device according to claim 15 wherein said window is an optical filter.

19. A test device according to claim 15 wherein the microwave energy range is 8 to 18 GHz and the infrared emits in the band 0.3 to 14 microns.

20. A test device according to claim 15 wherein the interior surface of said horn absorbs a portion of the infrared radiation incident on said horn.

* * * * *